J. S. CULP.
PRESSED STEEL VEHICLE WHEEL.
APPLICATION FILED MAR. 19, 1918.

1,285,630.

Patented Nov. 26, 1918.

INVENTOR
Jay Stanly Culp
BY
Fisher & ———
ATTORNEYS

UNITED STATES PATENT OFFICE.

JAY STANLY CULP, OF YOUNGSTOWN, OHIO, ASSIGNOR OF ONE-HALF TO JOSEPH M. CRENAN, OF YOUNGSTOWN, OHIO.

PRESSED-STEEL VEHICLE-WHEEL.

1,285,630.  Specification of Letters Patent.  Patented Nov. 26, 1918.

Application filed March 19, 1918. Serial No. 223,437.

*To all whom it may concern:*

Be it known that I, JAY STANLY CULP, citizen of the United States, residing at Youngstown, in the county of Mahoning and State of Ohio, have invented certain new and useful Improvements in Pressed-Steel Vehicle-Wheels, of which the following is a specification.

This invention pertains to an improvement in a pressed steel vehicle wheel, and which is especially adapted for use in aviation or flying machines, all substantially as shown and described and particularly pointed out in the claims.

Figure 1:
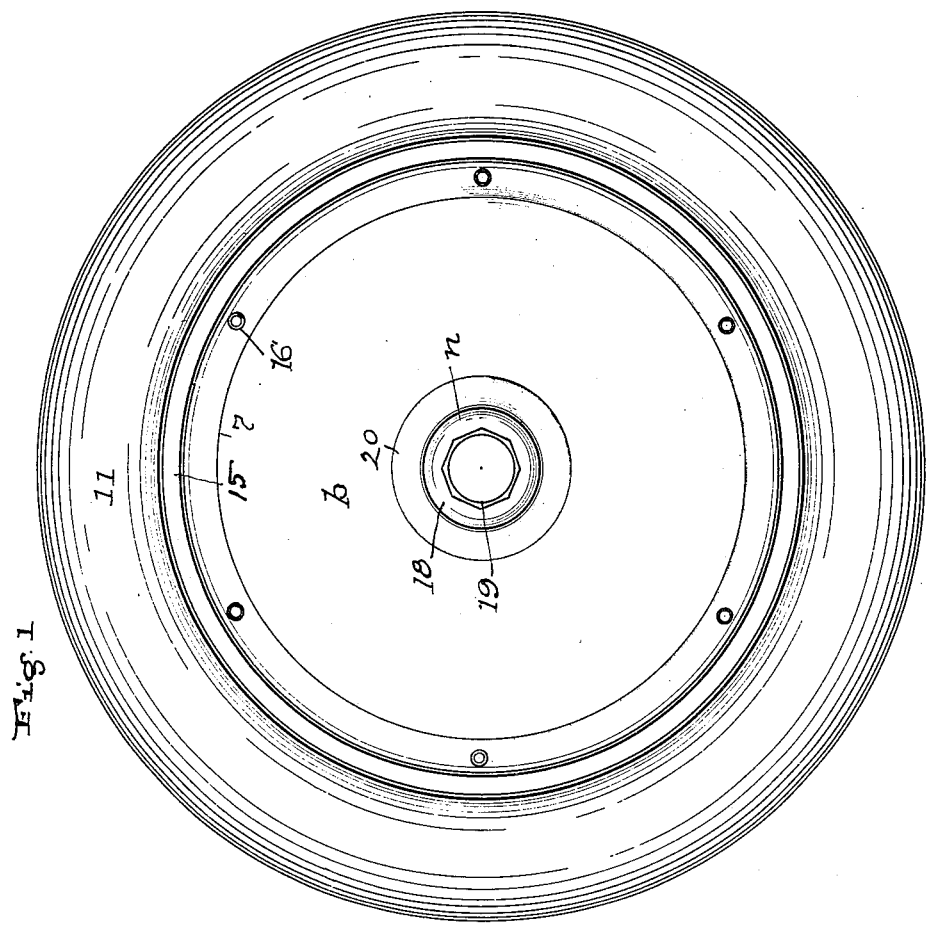
Figure 2:
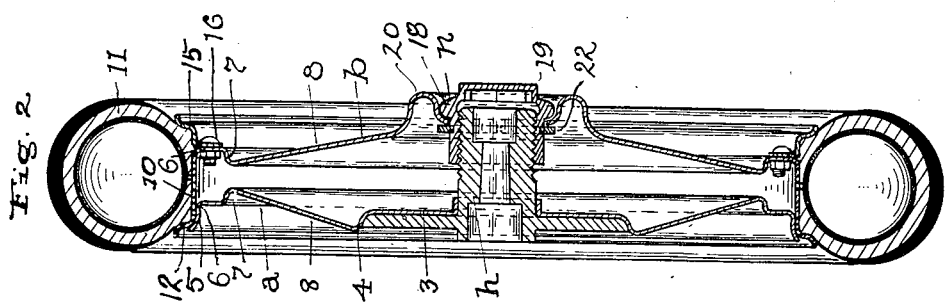

In the accompanying drawings, Figure 1 is a front side elevation of the wheel, and Fig. 2 is a central cross section thereof.

As thus shown and constructed an exceptionally light weight wheel is provided along with the necessary strength and resiliency, and which also is adapted to effect a speedy change when a fatal puncture or other injury is sustained, thus providing a wheel of excellent adaptation to air flight machines.

Structurally, the wheel embodies substantially disk-shaped sheet metal sides, say of aluminum, but of somewhat variable formation to serve the particular position in which they are located. Thus, the inner plate or member $a$ is struck up from a plain disk to the form clearly disclosed in Fig. 2, wherein it is shown as having a central sleeved opening engaged over the base of hub $h$ from the front thereof and bearing against the side of the flange 3 on the inner end of the hub, to which it may be secured if preferred. Said plate also has an annular shoulder or bulge 4 bearing all around on the edge of said flange 3, and the middle portion of the said plate is dished inwardly on the radial lines 8 to make these accommodations as well as to contribute otherwise to the action of said plate. The edge of the said plate is bent inwardly at substantially right angles and curved in cross section to form an annular seat 5 for the tire supporting portion or seat 10 on plate $b$, and has the incidental bends 6 and 7 in circles behind and next within the said seat 5 and which come successively about the outer portion of the said dished body. It will thus be seen that while a flat sheet metal disk lies at the bottom of this formation, the structure is quite different when completed and such as to contribute a certain measure of resiliency under the shock of a rapid descent as well as a non-collapsible support for the tire. However, resiliency in the wheel more especially depends upon the pneumatic tire 11 rather than in the plates by which the tire is sustained from the hub.

The front plate $b$ likewise is dished, outwardly, in its body or middle portion, corresponding in this respect to plate $a$ and by which the said dishes are given the straight lines 8 radially as shown. Both plates also have the annular bends 6 and 7 in their outer portions, but plate $b$ is bent inwardly at greater width than seat 5 to provide the relatively wide flat tire seat or rim 10 and is of such width as to extend inward to rest upon the seat 5 of plate $a$, and has its immediate edge projected upward and outward from seat 5 on which it rests to form a side rim portion 12 for engaging and confining the tire or tire casing 11 at said side. The opposite or outer side of the tire is supported by a removable or demountable rim 15 separably bolted to the plate $b$ at 16 at suitable intervals and serving to confine the tire on its seat.

At its middle the outer plate $b$ has a plain hole or opening engaged over a nut $n$ screwed onto the threaded end of hub $h$ and which nut has a bead or rib 18 engaged all around next with the angular head 19 thereon to apply a wrench, and said plate has an annular swell 20 of substantially U shape in cross section overlying said bead all around. A small split ring 22 is seated in a groove about the nut $n$ next within the plate $b$ and serves to confine the plate on the nut when the plate and the nut are removed together from the hub. This of course contemplates the removal also of the tire at the same time and while it rests on its seat 10, and when done the plate $a$ is left in its shown position on the hub. When such removal occurs the inside of plate $b$ is exposed and the nuts on the fastening bolts 16, which are inside, may then be removed and the rim 15 released and the tire taken off, if this be desired.

The tensioning of the plates $a$ and $b$ in bracing relations with the tire necessarily occurs by tightening the nut $n$, and tension is relaxed in the same proportion when the nut is withdrawn and in which operation the outer plate $b$ also is forcibly withdrawn because said plate is locked on the nut by the confining ring 22, as above described. Therefore, in practice, an extra plate with nut and tire mountings, may be carried, as complete extra wheels are now carried by some automobiles to effect quick and easy exchanges.

What I claim is:

1. A vehicle wheel having a hub provided with a flange about one end thereof and a nut engaged on the other end of said hub having a bead about its outer portion, an inner tire supporting plate on said hub having an annular shoulder at its middle resting on said flange and an outer tire supporting plate having an outward swell resting on said bead, a tire seated directly upon the edge portions of said plates and a demountable rim secured to said outer plate.

2. A vehicle wheel having a rubber tire and a hub and a set of oppositely disposed outwardly dished plates engaged on said hub and in sustaining relations to the tire, a nut screwed onto the outer end of the hub having a bead about the same and the outer of said plates confined on said nut and removable therewith and provided with an annular swell overlying said bead, the inner of said plates having an inwardly shouldered depression and a flange on said hub seated in said depression.

JAY STANLY CULP.